May 23, 1944.  J. GORMAN  2,349,617
BARBECUE APPARATUS
Filed Oct. 30, 1941
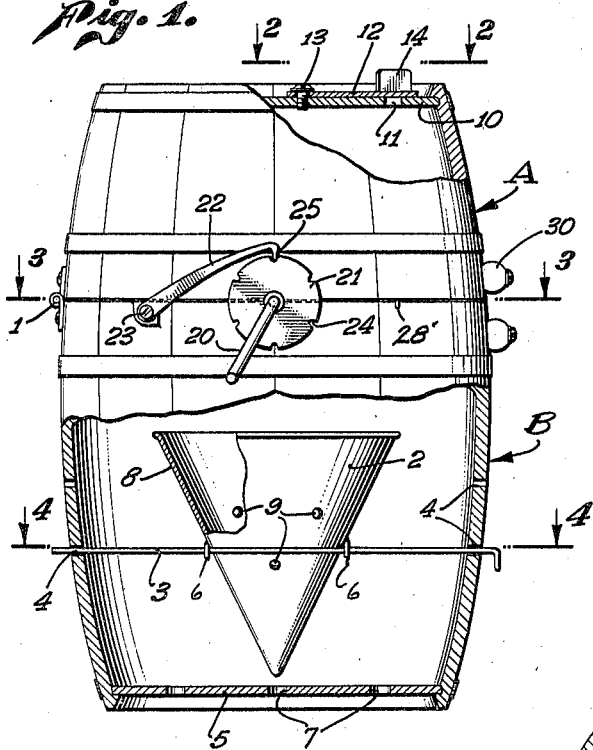
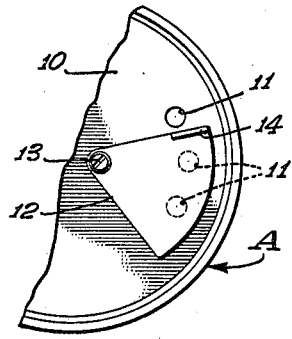
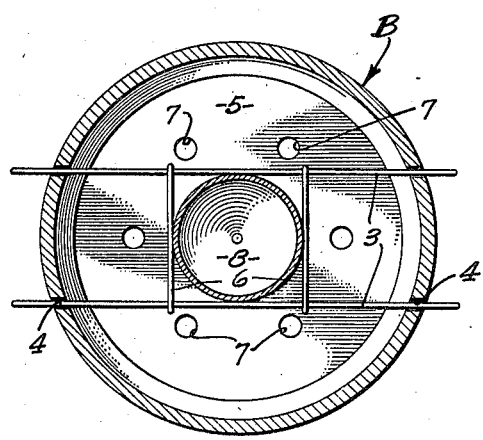
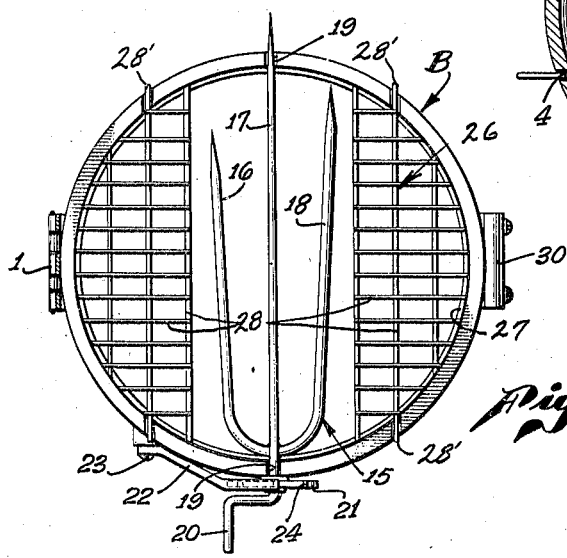
JOHN GORMAN, INVENTOR
ATTORNEY.

Patented May 23, 1944

2,349,617

UNITED STATES PATENT OFFICE 2,349,617

BARBECUE APPARATUS

John Gorman, Los Angeles, Calif., assignor, by direct and mesne assignments, of forty-nine two-hundredths to Sybil Gorman, Los Angeles, Calif., fifty-one one-hundredths to Walter E. Smith, and forty-nine two-hundredths to Ward D. Griffiths Application October 30, 1941, Serial No. 417,131

3 Claims. (Cl. 126—25)

This invention relates to barbecue apparatus and a primary object of the invention is to provide a simple, economical and portable apparatus arranged in a single unit and is preferably formed of an old wine cask which for long periods of time has been used for containing wines and the walls of which have become saturated with the wine, whereby the wine flavor may be imparted to the meats barbecued therein.

Another object is to utilize an old wine cask which has been cut diametrically so as to provide a top and a bottom portion of suitable height and which are adapted to be hingedly connected so as to afford a closed housing for containing the fire and the food to be cooked therein, suitable openings to the atmosphere being provided in the top and bottom portions for admitting and exhausting air so as to maintain a suitable draft.

A further object is to provide a spit rotatably mounted in the housing which is controlled as to its rotation by means of a suitable ratchet device whereby the food on the spit may be intermittently turned for a portion of a revolution during the cooking process, for uniformly cooking the food—usually but a single complete revolution of the spit being required for completing the cooking thereof.

Another object is to provide a fire box for the reception of charcoal or other fuel which is removably supported in the housing below the spit so that the heat therefrom will be directed upon the food held on the spit, and means for regulating the draft in the housing for the purpose of controlling the cooking operations. Other objects may appear as the description progresses.

I have shown a preferred form of apparatus embodying my improvements in the accompanying drawing, subject to modification within the scope of the appended claims, without departing from the spirit of my invention.

In said drawing:

Fig. 1 is a side elevation of the apparatus, partly in section;

Fig. 2 is a fragmentary top plan view as seen on line 2—2 of Fig. 1;

Fig. 3 is a sectional plan on line 3—3 of Fig. 1;

Fig. 4 is a sectional elevation on line 4—4 of Fig. 1.

My barbecue apparatus includes a used and preferably aged wine cask which is cut horizontally on line 3—3 of Fig. 1 to provide two mating sections A and B which are hinged together at 1 so that the upper portion A may be swung backwardly into open position on the axis of the hinge so as to afford access to the interior of the lower portion B. Portion B is adapted to support in the bottom thereof a firebox 2 preferably formed of conical cross section and in which a bed of charcoal is held for providing the necessary fire.

Firebox 2 is removably supported by means of a pair or more of horizontal rods 3, 3, which are removably positioned in peripheral holes 4, 4, arranged at one or more elevations above the bottom 5 of the cask. Firebox 2 has a plurality of externally arranged clips 6, 6, attached to or formed on the exterior thereof and adapted to overlie and hold the firebox on the rods 3, 3.

The bottom 5 of the cask is provided with a plurality of holes 7, 7, which in addition to the unused holes 4, 4 on the wall of the cask provide air inlet and draft means for the apparatus. Also the wall 8 of the firebox may have a plurality of holes 9 formed therein so that air may be admitted to the interior of the firebox as may be required for complete combustion of the charcoal. The top 10 of member A has a series of holes 11, 11, for the purpose of providing a draft through the body, the effective area of which is controlled by means of a damper 12 pivoted at 13 to the top and capable of being moved over the holes 11, as by means of grip or finger piece 14.

A spit 15, preferably in the form of a trident with prongs 16, 17 and 18 is rotatably held on the upper edge of member B either in a suitable bearing, as by means of a clamp, or, as shown merely in grooves 19 formed in the body at diametrical points and in which grooves portions of the central prong 17 are rotatably seated. One end of the prong 17 is provided with a crank handle 20 for rotating the spit and said crank is mounted outwardly of a ratchet disc 21 to which the central prong 17 or the handle 20 is suitably secured for common rotation therewith.

The rotation of the spit is controlled by means of a pawl 22 which is pivotally mounted at 23 on the wall of the member B, preferably in the position shown in Fig. 1 whereby the force of gravity will hold the pawl in engagement with ratchet 21 but capable of being spring held in a usual manner. Ratchet 21 has a plurality of notches 24 on the periphery thereof which are engaged by the end 25 of the pawl. Thus, heat, fish or fowl when held on the spit 15 are arranged for rotation relative to the fire in the firebox 2 at intervals and are held in adjusted position by means of the pawl and ratchet. Usually one complete revolution of the spit is necessary to thoroughly cook the food carried by the spit, the spit being adjusted at uniform intervals and rotated a fraction of a revolution at each operation of the ratchet.

It may be noted that the heat being entirely confined in the cask and controlled by the damper 12, the cooking is more quickly effected than when the food is cooked on an open barbecue pit or apparatus. Moreover, the walls, top and bottom of the cask being saturated from long use in holding wines, the heat serves to draw out the flavor of the wines from the cask and to a sufficient extent impregnate the food therewith, thus providing a delicious flavor.

As shown in Fig. 3, a grill 26 may be used in lieu of the spit 15 for the purpose of broiling steaks, chops, etc. Said grill is composed of a circular wire or rod 27 to which is attached a suitable number of cross wires or rods 28, either in parallelism or at angles, some of said wires or rods, as at 28' being extended slightly from the periphery of the grill to overlie and rest upon the upper edge of the member B. When the grill is used the firebox 2 is usually elevated above the position thereof when roasting foods, so that the heat will more directly attack the food on the grill.

The grill 26 may be operatively positioned for use with the spit by providing a central area thereof with an opening free from the cross wires so as not to prevent the rotation of the spit and the meat thereon, while at the same time permitting the broiling of other meats on the grill in positions laterally of the meats being barbecued.

A suitable handle 30 is provided on the lower portion of member A by means of which said member may be swung into and from closing position on the bottom member B.

What I claim is:

1. A barbecue apparatus comprising: a wine saturated wooden wine cask cut horizontally to provide two mating sections, means for hinging said sections together at their junction line, one section of said cask having an air inlet and the other section having an air outlet, a spit rotatably supported on the lower section of the cask, at the junction of said sections a ratchet device on the exterior of the lower portion for regulating the rotation of the spit, a firebox removably mounted in said lower section and selectively adjustable vertically relative to the spit, and rods insertible in perforations in the wall of said barrel and engaging said firebox for supporting the firebox for use.

2. A barbecue apparatus comprising: a housing formed of saturated wood and adapted to be arranged in upright position for use, said housing having a bottom section forming a base and an upper section hinged to the bottom section for providing a hollow cover, said lower section arranged to support a spit rotated on the upper edge thereof, and also arranged to support a firebox removably held in said lower section so as to direct heat upwardly for application to food carried by said spit, said upper and lower sections having openings to the atmosphere for providing a draft during cooking operations.

3. A barbecue apparatus as characterized in claim 2 in which said housing sections are provided with abutting edges for sealing engagement during a cooking operation.

JOHN GORMAN.